(12) United States Patent
Kandel (10) Patent No.: US 6,631,880 B2
(45) Date of Patent: Oct. 14, 2003

(54) PREVENTATIVE STOP VALVE SYSTEM AND METHOD

(76) Inventor: Leroy J. Kandel, 208 S. Wenger Rd., Dalton, OH (US) 44618

( * ) Notice: Subject to any disclaimer, the term of this patent is extended or adjusted under 35 U.S.C. 154(b) by 56 days.

(21) Appl. No.: 09/832,127

(22) Filed: Apr. 11, 2001

(65) Prior Publication Data

US 2002/0148990 A1 Oct. 17, 2002

(51) Int. Cl.[7] ............................................. F16K 31/00
(52) U.S. Cl. .......................... 251/14; 251/63; 251/90; 91/445; 91/513; 91/517
(58) Field of Search .............................. 251/14, 63, 90; 91/517, 513, 445

(56) References Cited

U.S. PATENT DOCUMENTS

| | | | | |
|---|---|---|---|---|
| 1,100,317 A | * | 6/1914 | Masterson | 251/14 |
| 1,361,581 A | * | 12/1920 | Hibner | 251/63 |
| 1,488,878 A | * | 4/1924 | Heath | 251/63 |
| 1,516,011 A | * | 11/1924 | Heath | 251/14 |
| 2,496,286 A | * | 2/1950 | Goldman | 251/14 |
| 3,382,771 A | * | 5/1968 | Nutter | 91/517 |
| 4,063,489 A | * | 12/1977 | Parquet et al. | 91/445 |
| 4,274,328 A | * | 6/1981 | Pedersen | 91/445 |
| 4,282,797 A | * | 8/1981 | Hirsch | 91/445 |
| 4,286,502 A | * | 9/1981 | Bianchetta et al. | 91/445 |
| 5,540,258 A | * | 7/1996 | Cho | 91/445 |

* cited by examiner

Primary Examiner—Gene Mancene
Assistant Examiner—John Bastianelli
(74) Attorney, Agent, or Firm—Richard B. O'Planick

(57) ABSTRACT

A preventative stop valve system for a wheeled trailer carrying hydraulic equipment is disclosed comprising a stop valve fitted for insertion in-line into the hydraulic line servicing the trailer equipment; the stop valve comprising a reciprocating piston moveable between open and closed positions. The stop valve is connected to the pressurized air line extending to the air brakes of the trailer. Actuation of the stop valve is controlled pneumatically by the setting and release of the air brakes of the trailer by the operator, utilizing conventional controls for the air brakes. A manual override mechanism is further provided for opening the stop valve manually in the event that the hydraulic equipment carried by the trailer must be utilized when pressurized air line to the trailers is disconnected.

23 Claims, 4 Drawing Sheets

PREVENTATIVE STOP VALVE SYSTEM AND METHOD

TECHNICAL FIELD

The invention relates in general to fluid stop valves and, more specifically, stop valves for hydraulic lift systems.

BACKGROUND ART

Hydraulic lift systems are common in many industrial applications. By way of example, many truck units employ one or more hydraulic cylinders for the purpose of elevating and lowering a truck bed. In such applications, a trailer is generally coupled to a tractor and includes a bed, or other hydraulic superstructure, that can be raised or lowered. It is common to carry loose material within the bed such as gravel or earth. The bed is pivotally coupled to the trailer frame at a rearward location. One hydraulic cylinder or, as is more typical, a system of telescopic hydraulic cylinders is mounted to a forward end of the trailer, below a forward end of the trailer bed. Hydraulic fluid is pumped from the tractor into the hydraulic cylinders to cause the cylinders to extend and raise the forward end of the trailer bed. Once raised, the trailer is readily emptied of its contents. Thereafter, the operator of the unit causes hydraulic pressure to be gradually withdrawn from the lift cylinders and the cylinders slowly retract, lowering the bed of the trailer.

The user activates the hydraulic lift system from the cab of the tractor or from an exterior location, depending upon the design of the lift. Hydraulic fluid is highly pressurized and directed to the lift cylinders by appropriate flexible conduits. The conduits or hoses, typically formed of rubber or composite materials, are routed from the pump unit, along the trailer chassis, and to the lift cylinder(s). The route followed by the flexible hydraulic hoses is typically non-linear and includes several bends or elbows. These bends or elbows, however, represent constrictions where breakage of the high pressure line can, and frequently does, occur. Moreover, breakage generally occurs when the line is in the high pressure mode; that is, when the bed is raised and the lift cylinders fully extended.

Breakage in the hydraulic line at or near the lift cylinders causes immediate expulsion of the pressurized hydraulic oil to the ground or upon the equipment. In addition to creating an environmental event requiring extensive clean up, the expulsion of the pressurized hydraulic fluid causes an immediate loss of pressure to the lift system. If the breakage occurs while the cylinders are extended and the bed elevated, the lift cylinders will retract immediately, rather than gradually, and the bed of the trailer will precipitously fall. The falling bed can destabilize and tip the tractor and trailer over, causing considerable damage to the trailer and/or tractor. More importantly, a freefalling bed can pose a risk of bodily injury to surrounding individuals or the operator of the unit. The operator, stationed at the controls for the hydraulic system, will generally observe a breakage in the hydraulic line to the lift cylinders. However, even if a breakage is detected, the operator is powerless to prevent the resultant sudden failure of the lift system and consequent rapid collapse of the elevated bed.

A preventative stop valve system, accordingly, is needed in the industry to prevent a precipitous loss of hydraulic fluid from a lift system in the event rupture of hydraulic lines occur. Such a stop valve would be useful if positioned in the hydraulic system so as to stop rapid expulsion of hydraulic fluid from the lift cylinders in the event the hydraulic lines rupture. The valve, however, to be effective, must operate quickly to stem the outflow of hydraulic oil. The valve should further be of reliable construction, be convenient to activate, and operate predictably when needed to effectively abate the loss of fluid. In addition, because of the large number of lift units already in use, a suitable preventative stop valve system should be capable of retrofit implementation into existing lift units with a minimum level of inconvenience and expense. Achievement of a suitable valve system would prevent a catastrophic collapse of the lift system and eliminate consequential damage to property and injury to personnel.

SUMMARY OF THE INVENTION

It is, therefore, an object of the invention to provide a preventative stop valve system for hydraulic lift units that prevents a precipitous loss of hydraulic fluid in the event rupture of hydraulic lines occurs.

A further object of the invention is to provide a preventative stop valve system that operates quickly to stem the outflow of hydraulic oil in the event that a rupture of hydraulic lines occurs.

Another object of the invention is to provide a preventative stop valve system that is capable of retrofit implementation into existing lift units with a minimum level of inconvenience and expense.

Still further, it is an object of the invention is to provide a preventative stop valve system that is of reliable construction, convenient to activate, and operates predictably when needed to effectively abate the loss of fluid.

Yet another object of the invention is to provide a preventative stop valve system that self-tests responsive to normal operation of a tractor-trailer unit.

An additional object of the invention is to provide a stop valve system for a trailer lift unit having an override mechanism for allowing use of the lift unit when the trailer is decoupled from a tractor.

An ancillary object of the invention is to provide a preventative stop valve system for a trailer lift unit compatible with existing user-operated controls for the trailer.

A further object of the invention is to provide a method of retrofitting existing trailers with a preventative stop valve system that operates quickly to stem the outflow of hydraulic oil in the event that a rupture of hydraulic lines occurs.

These and other objects, which will be apparent to one skilled in the art, are achieved by a preferred embodiment described below. The preventative stop valve system comprises a stop valve interposed in the hydraulic line of a trailer lift unit. The valve includes an elongate housing having an internal chamber and intake and outlet fluid portals extending through sidewalls of the housing and establishing with the internal chamber a fluid flow path. A piston member is reciprocally moveable within the chamber between an open and closed position. In the closed position, the piston obstructs the fluid flow path while, in the open position, the piston permits fluid to flow through the housing chamber. A spring member biases the piston in the closed position. The housing further includes an air intake portal in one end connected to the air brakes of the trailer. High pressure at the intake portal, a consequence of setting the trailer air brakes, is necessary to override the spring member and open the valve. Release of the air pressure to the brakes, typically from the cab of the tractor, drops the air pressure at the valve air intake portal and causes the valve to close. The switch used to release the brakes can thus be activated by the user to close the valve and stop the release of hydraulic oil in the event that a rupture in the hydraulic lines is detected. An override arm is further provided to allow activation of the stop valve with the trailer decoupled from its associate tractor. The override arm accordingly allows the valve to be opened and the lift unit raised when the brake system of the trailer is decoupled from the tractor.

For the benefit of existing tractor-trailer units, a method of retrofitting existing units with a preventative stop valve system is provided. The method comprises the steps of: a.) connecting a stop valve housing in the hydraulic line, the housing including an air intake portal at one end; an elongate piston seated within a central chamber of the housing and reciprocally moveable within the chamber responsive to a drop in air pressure at the air intake portal between an open position and a closed position, the piston obstructing the flow of fluid through the housing in the closed position and allowing the flow of fluid through the housing in the open position; b.) connecting the air intake portal of the valve housing to the trailer brake air line; and c.) selectively releasing the brakes of the tractor-trailer to cause a drop in air pressure at the air intake portal of the stop valve and consequently move the piston into the closed position.

BRIEF DESCRIPTION OF THE DRAWINGS

FIG. 2 is a left front perspective view of the subject preventative stop valve.

DETAILED DESCRIPTION OF THE INVENTION

Figure 1:
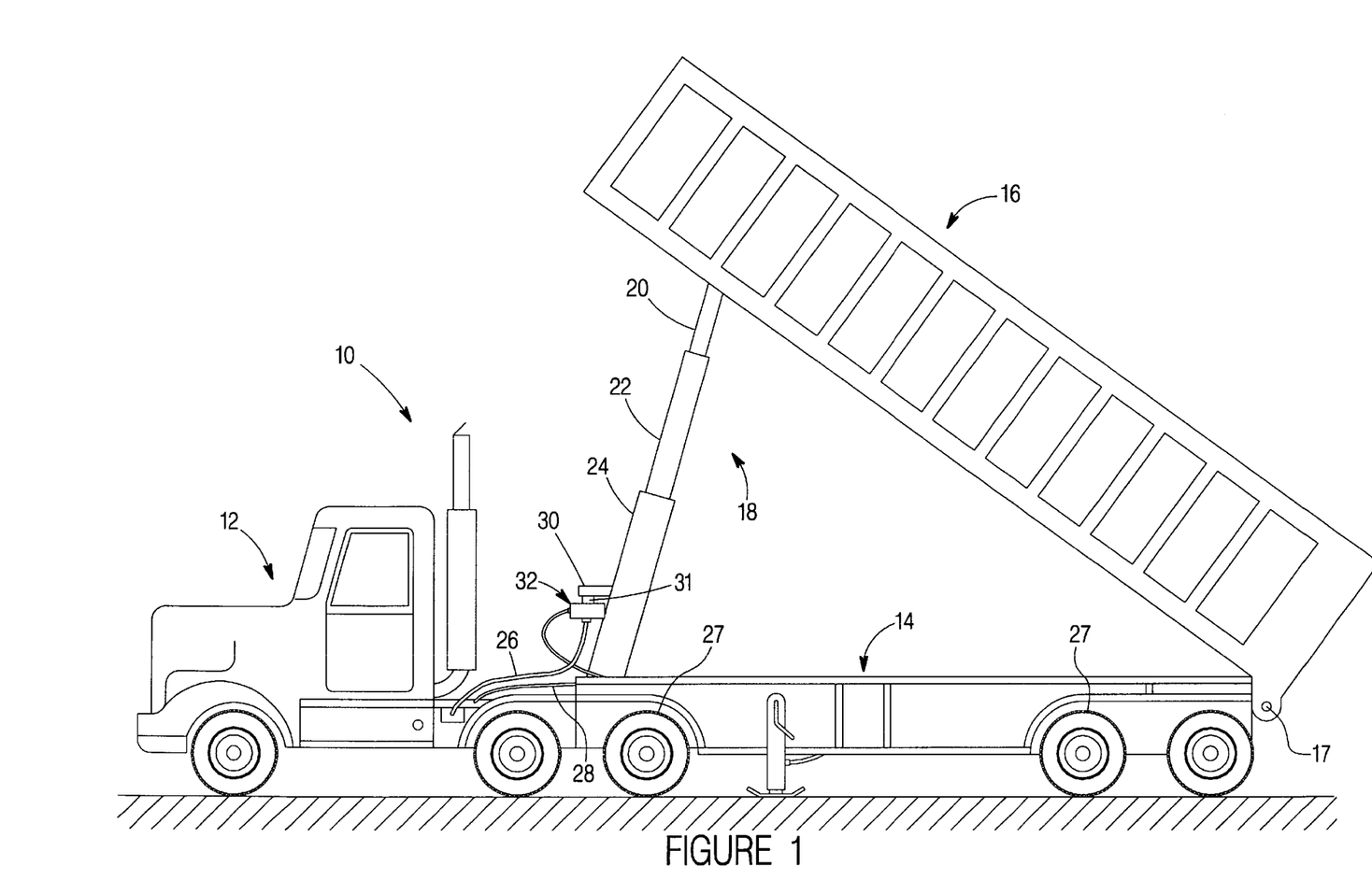
FIG. 1 is a side elevation view of a tractor-trailer unit shown with the bed raised in an elevated position and the subject preventative stop valve system installed.

Referring initially to FIG. 1, the subject preventative stop valve system is intended for incorporation into a typical tractor-trailer rig as depicted at 10. While of specific utility for such an application, the stop valve system has applications for other types of units that employ hydraulically operated cylinders. In the context of tractor-trailer units, the subject stop valve system may be incorporated by the manufacturer as original equipment or the stop valve system may be retrofitted into existing tractor-trailers as will be explained below.

The tractor-trailer units of the type depicted in FIG. 1 generally comprise a tractor 12 that hitches to and transports a trailer 14. The trailer may be equipped with various hydraulic apparatus for performing specific functions. In FIG. 1, a bed 16 is pivotally mounted at a rearward end to the trailer 14 by pivot connection 17. An assembly of telescoping hydraulic cylinders 18 are mounted to a forward end of trailer 14. The cylinder assembly 18 comprises three stages; namely, an uppermost, smaller diametered, cylinder 20, a middle, intermediate diametered, cylinder 22, and a lower or bottom, larger diametered cylinder 24. While three stages are shown in the embodiment of FIG. 1, the invention need not be so restricted. More or fewer cylinders may be used in sundry applications. The cylinders 20, 22, 24 telescope together and expand as shown in FIG. 1 in commonly used tractor-trailer units. The upper end of cylinder 20 is coupled to the bed 16 and the lower cylinder 24 is connected to the trailer 14 by conventional means.

Pressurized hydraulic fluid is routed to the lower cylinder 24 by hydraulic line 26. Conduit 26 is typically formed of rubber or composite material and extends from an oil pump (not shown) carried by the tractor 12. The conduit is routed to cylinder 24 and the path invariably includes several bends or elbows as will be observed in FIG. 1. The oil carried by the conduit 26 is highly pressurized, typically to four thousand pounds per square inch. It is common in the industry to couple the conduit 26 to the cylinder 24 by means of a swivel fitting 31 that is attached to an input conduit 30. The input conduit communicates with the cylinder 26.

The user activates the hydraulic system from a control typically located in the cab of the tractor. Once the control is actuated by the user, the hydraulic pump forces hydraulic fluid into the conduit 26. The pressurized fluid exits the hose 26, travels through the swivel fitting 31, and enters into the cylinder 24 via input conduit 30 where it applies the mechanical force required to extend the cylinder assembly 18. As the cylinders telescope outward, the bed 16 is tilted backward and the contents may be discharged from a rearward end. Once the bed 16 is emptied, the user cuts the hydraulic pump off and the fluid slowly exits the cylinder system 18, causing the cylinders 20, 22, and 24 to telescope in and the bed 16 to fall gradually back upon the trailer 14.

FIG. 1 illustrates that trailers in common use in the industry include wheels 27 and a pneumatic braking system (not shown). The pressurized air necessary to set the pneumatic brakes for wheels 27 is supplied by an air conduit or hose 28. The brake air line 28 extends from a compressor that is typically carried by tractor 12. The user activates the air brakes by a switch or control located in the cab of the tractor 12, and causes the compressor to force pressurized air at approximately one hundred twenty-five p.s.i. to the air brakes of trailer 14 via conduit 28. The conduit 28 is generally routed along the length of the chassis of the trailer 14 to the brake units. The air brakes to the trailer 14 are normally set and released many times during the course of a day's work by the operator of the tractor-trailer 10. Each time the brakes are set and released the air pressure in the air line 28 goes from a high to low state.

As mentioned previously, the conduit or hose 26 supplying pressurized hydraulic fluid to the cylinders system 18 typically includes several bends or elbows. At high pressure, i.e. when the cylinder system 18 is fully extended and the bed 16 is fully raised, the hose 26 is prone to breakage. The breaks commonly occur at the bends or elbows in the line. When the line breaks, the hydraulic fluid in the cylinder system 18 drains very quickly, causing a precipitous retraction of the cylinders 20, 22, and 22 and a rapid fall of the bed 16. The oil is discharged upon the ground and/or the tractor-trailer and can cause environmental damage. In addition, the time and effort to gather the discharged oil is considerable and creates a significant expense. More significantly, the rapid descent of the bed 16 creates a dangerous situation for the tractor-trailer unit and the operator. The collapse of bed 16 can act to tip the tractor-trailer over or cause significant damage. Such an uncontrolled descent can also cause bodily injury to the operator.

Shown assembled to the tractor-trailer 10 in FIG. 1 is a preventative stop valve 32. The valve 32 is interposed in the hydraulic line 26 where the line enters the input conduit 30 by way of swivel fitting 31. The unit 32 may be manufactured and installed as original equipment in the tractor-trailer 10 or be installed into existing tractor-trailers as a retrofit. The purpose of the stop valve 32 is to prevent oil from draining from the cylinder assembly 18 in the event that the hydraulic 26 ruptures. For this reason, it is desirable to locate the valve unit 32 adjacent to the cylinder 24. However, the unit 32, while preferably located at the input conduit 30 to cylinder 24, may be located at other locations along the hydraulic line 26 if so desired.

The specific configuration of the stop valve 32 is shown in FIGS. 2A, 2B, 3, and 4. With reference to such views, the valve 32 is seen to comprise a rectangular, elongate housing 34 preferably formed of high strength metal such as steel. The housing 34 includes a central axially disposed, generally cylindrical chamber 36 defined by sidewalls 37. Extending through one end of the housing 24 is a cylindrical bore 38 and extending through an opposite end of the housing 24 is a threaded assembly bore 40. Bores 38, 40 communicate with the central chamber 36. The chamber 36 extends between opposite ends 42, 44.

Figures 2A, 2B:
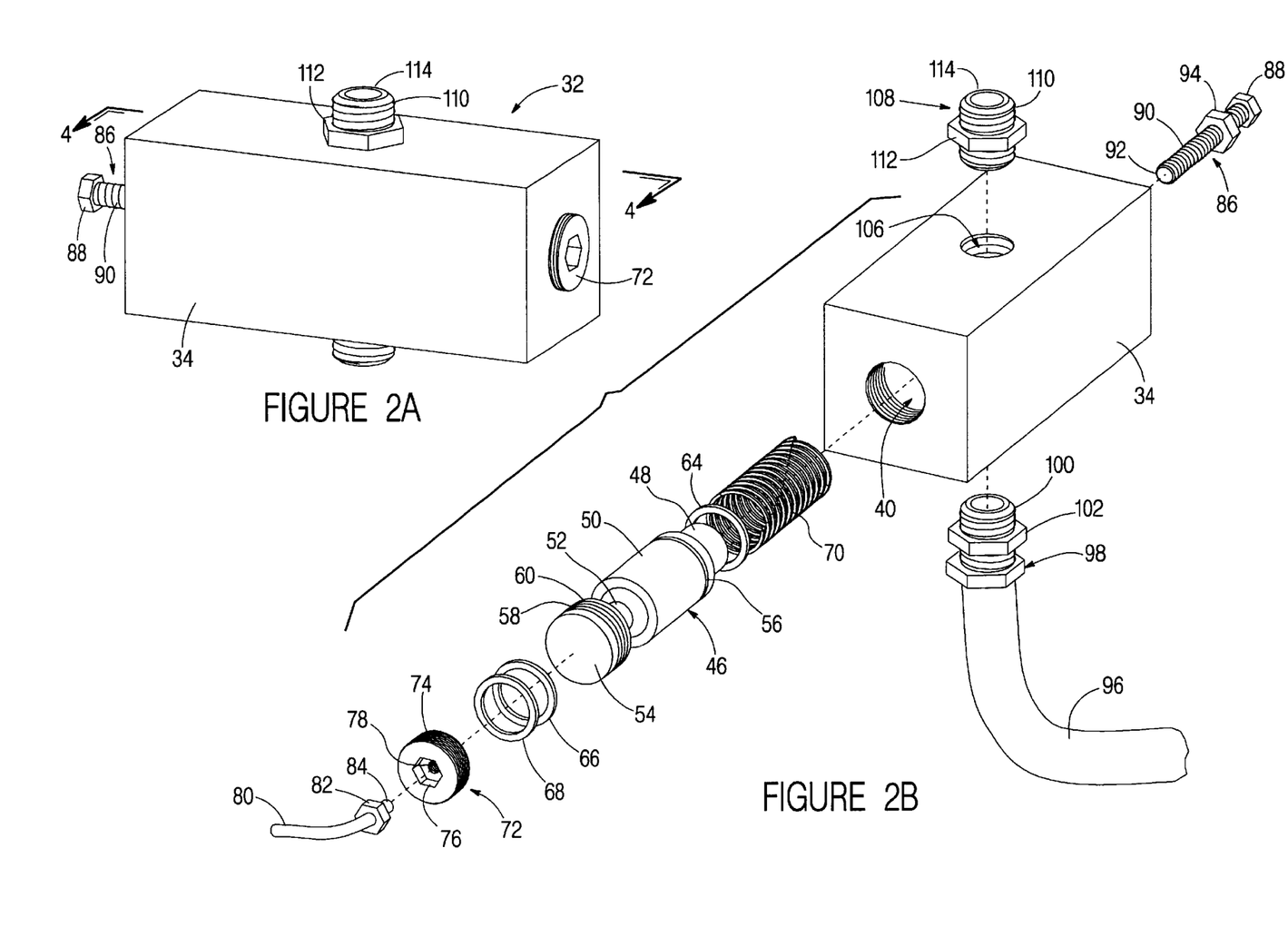
FIG. 2B is an exploded perspective view of the preventative stop valve.

An elongate, generally cylindrical piston 46 is provided mounted within the chamber 36. Piston 46 is machined preferably from a high strength metal such as steel and includes a forward nose portion 48 of relatively smaller diametric dimension; a mid-portion 50 diametrically dimensioned nominally smaller than the chamber 36; a rearward neck portion 52 of relatively smaller diametric dimension; and an end portion 54 having a diameter substantially equivalent to the mid-portion 50. An annular O-ring channel 56 is formed within and circumscribes the piston nose portion 48. Two additional spaced-apart O-ring channels 58, 60 are formed within and circumscribe the end portion 54. The channels 56, 58, 60 are dimensioned to closely receive and seat O-rings 64, 66, 68, respectively. The O-rings 64, 66, 68 are commercially available and are composed of elastomeric rubber or composite plastic material. More or fewer O-rings may be used is desired.

A helical compression spring 70 mounts to the nose portion 48 of piston 46. The spring 70 is commercially available and is preferably formed of high strength steel or other material having acceptable spring properties. The spring 70 is received over the nose portion and abuts against the piston mid-portion 50. The stop valve assembly further includes an end cap 72 of generally cylindrical form, preferably composed of a hard material such as steel. The end cap, or plug 72 is externally threaded as indicated at 74. The cap 72 includes an axial hexagonal socket 76 extending therein from a rearward end and a counter bore 78 extending from the socket 76 through the cap 72. The cap 72 has an outer diameter dimensioned to enable cap 72 to screw into the bore 40 of housing 34.

As seen in FIG. 1, the housing 34 is intended to be positioned in-line with the hydraulic line 26, preferably proximate to the cylinder 24. A feeder air line 80 extends from the rearward end of the housing 34 downward to tap into the main brake air line 28. A conventional tap fitting (not shown) terminates the lower end of feeder line 80 and connects line 80 into a conveniently accessible portion of line 28. The upper end of feeder line 80 includes an annular hex nut 82 and annular end fitting 84. Illustrated best by FIGS. 2B, 3 and 4, the fitting 84 is sized for press fit into the forward bore 78 of cap 72. The hex nut 82 of the line 80 resides within the socket 76 of the cap 72. So connected, the feeder line 80 represents an air conduit from the brake line 28 to the internal chamber 36 of housing 34.

Figure 3:
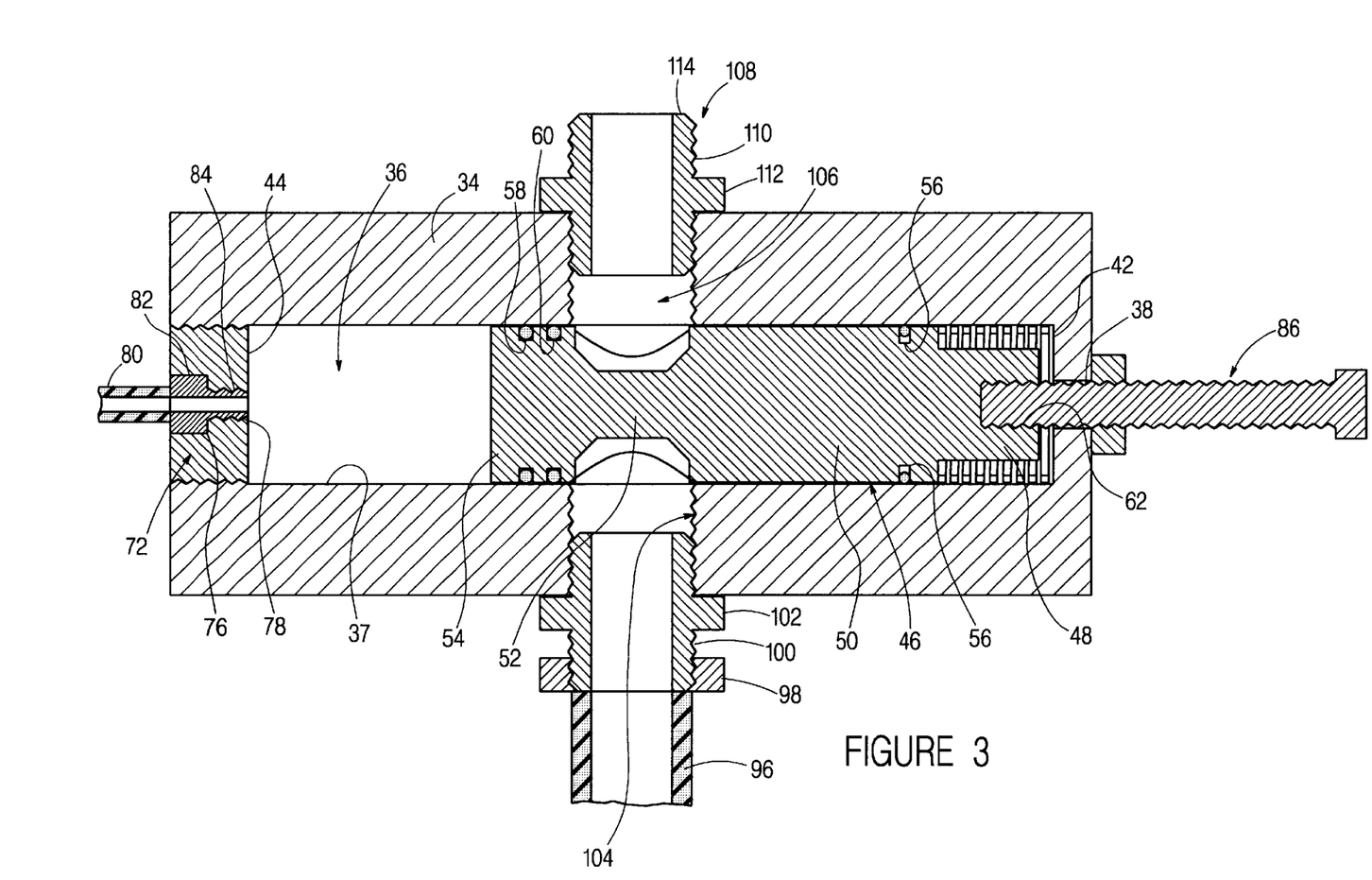
FIG. 3 is longitudinal section view through the preventative stop valve showing the piston in the open position.

An override bolt 86 is configured having a rearward end head 88; a threaded shank 90; a terminal forward end 92; and a lock nut 94. The bolt 86 is preferably fabricated from a suitably high strength material such as steel. Bolt 86 is usually disattached from the housing 34 and is only used when needed, as will be explained below. When disattached, the bolt 86 is stored at a location conveniently accessible to the user of the tractor-trailer. The bore 38 through housing 34 is closed by a plug (not shown) of cylindrical configuration when the bolt 86 is disattached. The shank 90 of bolt 86 is dimensioned to closely protrude through bore 38 of housing 34 and thread into the bore 62 of piston 46 a distance of approximately three-eighths of an inch. The nut 94 is positioned thereby external of and against the housing 34 as shown in FIG. 3, accessible to the operator. The nut 94 may be adjusted by selective clockwise or counterclockwise rotation by an appropriately sized wrench.

Referring to FIGS. 1, 2A, 2B, 3, and 4, the housing 34 is intended for position in-line with the hydraulic conduit 26 to cylinder 24. A terminal portion 96 of hose 26 is normally attached to the input block 30 of cylinder 24 by means of swivel fitting 31 in tractor-trailer units. The end portion 96 includes a connector comprising a swivel fitting 98; a threaded end fitting 100; and a coupling nut 102. The end 100 threads into a socket (not shown) to swivel fitting 31 and secures end portion 96 to the input conduit 30 to cylinder 24.

The subject preventative stop valve 32 may be retrofitted to existing trailers by disattaching the end 100 of end portion 96 from the swivel fitting 31 and interposing housing 34 between end portion 96 and the fitting 31. End 100 of conduit end portion 96 screws into a threaded bore 104 in an underside of the housing 34. The conduit end portion 96 is tightened into the bore 104 by coupling nut 102. So connected, the conduit 26 via end portion 96 is in communication with the central chamber 36 of the housing 34. At the opposite side of the housing 34, a threaded outlet bore 106 is provided from the chamber 36 through the sidewall of housing 34. A fitting 108 is provided that screws into the bore 106. Fitting 108 includes external threads 110 and a coupling nut 112 for tightening the fitting 108 into the bore 106. It will be appreciated that the outward end 114 of the fitting 108 is thus configured to couple with the swivel fitting 31 of the conduit 30 just as the fitting 98 of the conduit 96 prior to placing the stop valve in the hydraulic line. A fluid path is established through the housing 34 and extends from the input end 96 of conduit 26 through housing bore 104, thence through chamber 36 of housing 34, exiting out the housing bore 106. The path continues on via input conduit 30 into the lower cylinder 24.

Figure 4:
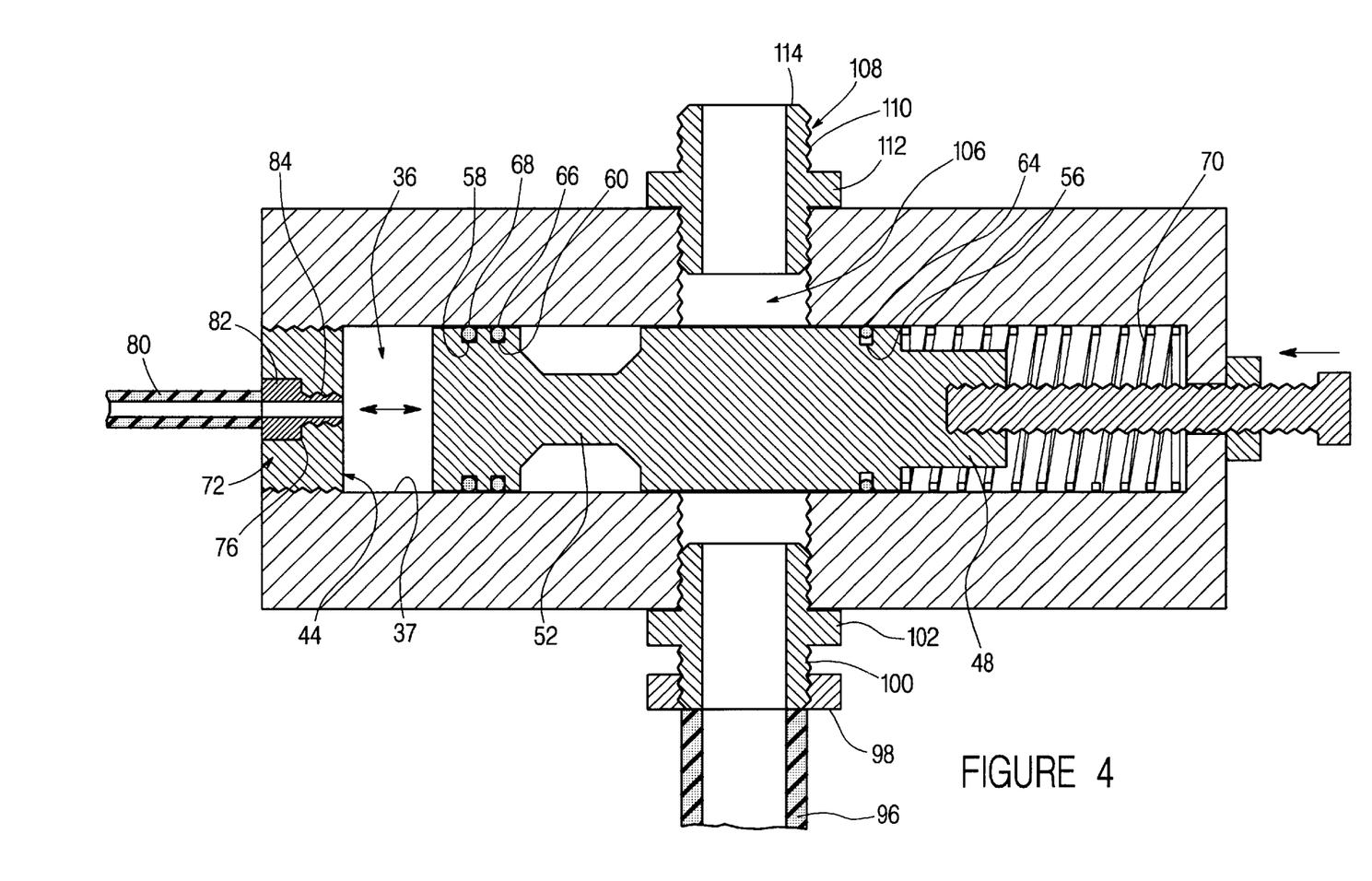
FIG. 4 is a longitudinal section view through the preventative stop valve taken along the line 4—4 of FIG. 2A and showing the piston in the closed position.

FIGS. 2B, 3, and 4 illustrate the position of the piston 46 within housing bore 36 relative to the connections of housing to hydraulic line 96 and pneumatic line 80. The piston reciprocates between an "open" position illustrated by FIG. 3 and a closed position illustrated by FIG. 4. In the open condition shown by FIG. 3, the air pressure at the rearward end of the chamber is high, forcing piston 46 to the right until piston neck portion aligns with bores 104, 106 of housing 34. The fluid path from conduit end portion 96 through the housing is thus uninhibited and oil may pass through the housing 34 around neck portion 52 of the piston 46 and into cylinder 24 via conduit 30. The stop valve 32 in the open position thus allows the cylinder system 18 to function in raising and lowering bed 16. In the open condition, spring 70 is compressed against the forward end of the housing 34 as shown in FIG. 3.

Should the air pressure at the rearward end of housing 34 drop, or go "low", the compression spring 70 will release and drive piston 46 left into the "closed" position depicted in FIG. 4. In the closed position, piston portion 50 is interposed between bores 104, 106, obstructing the hydraulic fluid path through housing 34. In the closed position, the stop valve 32 thus blocks oil from passing into or out of the cylinder 24. The O-rings 64, 66, 68 are mounted to and move with the piston 46 along housing chamber 36 and establish a tight seal against the sidewalls 37.

It will be appreciated that the stop valve air input line 80 is connected to the brake line 28 that extends along the trailer 14 and controls operation of the trailer brakes. The pressure at stop valve chamber 36 is high when the brakes of the trailer are set. That is, when the operator sets the trailer brakes from control switches in the cab, the operator is automatically pressurizing chamber 36 of housing 34 to a "high" condition which drives the piston 46 to the right, opening the valve. Releasing the brakes of the trailer 14 via line 28 causes the pressure at stop valve chamber 36 to go "low" releasing piston 46 to move to the left under the influence of spring 70, closing the valve. In the closed condition, no oil will enter or leave the cylinder system 18.

In operation, the subject stop valve provides a convenient, reliable spill preventative mechanism in the event that the hydraulic line 26 ruptures. The operator of the lift typically utilizes the hydraulic line controls from the cab of the tractor 12. The pneumatic controls for line 28 which set and release brakes of the trailer 14 are in the same general location within the cab. An operator, in order to activate the lift assembly 18 must set the brakes to trailer 14, whereby causing the stop valve 32 to open and allow hydraulic oil to flow into cylinder 24. Should a rupture in line 26 occur, it will be immediately detected by the operator who, upon discovering the rupture, can release the brakes to trailer 14 by cutting the air pressure to the brakes via line 28. Releasing the brakes causes stop valve 32 to immediately close, blocking the oil in the cylinder assembly 18 from escaping and spilling to the ground through the ruptured area of line 26.

By preventing the oil from escaping system 18, environmental damage to the ground or equipment is prevented. Moreover, keeping the oil in the system 18 maintains the bed 16 in an elevated, safe position. Bed 16 is thus prevented from a precipitous fall to the trailer 14 that might otherwise cause damage to the tractor-trailer or injury to the operator or nearby personnel. The controls for lines 26, 28 are standard equipment in tractor-trailer units, located typically in the cab of the tractor. The subject preventative stop valve accordingly is controlled by available controls with which the operator is familiar. As such, the stop valve is convenient and easy to install and utilize in existing tractor-trailer units as a retrofit improvement.

It will be further be appreciating that the subject preventative stop valve is self-testing and, accordingly, operates dependably whenever it is needed. Each time the brakes to trailer 14 are set and released, the valve 32 cycles through an open-close cycle and its state of readiness is tested. Should the valve fail to open or close, the operator will immediately detect the failure and effect repairs, rather than waiting until a rupture occurs in the hydraulic line. Daily cycling the trailer brakes, and with them the stop valve 32, assures the operator that the valve will function as intended should it become necessary. It should further be noted that releasing the brakes of trailer 14 by line 28 during a hydraulic line rupture does not place the trailer 14 in a free-rolling condition. Auxiliary, secondary, brakes of trailer 14 are present and will remain locked after the brakes to line 28 are released. The secondary brakes thus serve to maintain the trailer stationary should the stop valve be closed during an emergency by the release of brakes serviced by line 28.

From time to time it may become necessary to elevate the bed 16 when the trailer 14 is unattached to the tractor 12. By way of example, the trailer 14 may be in the process of being serviced. It may further be necessary to elevate the bed 16 during the execution of such repairs. An auxiliary hydraulic pump, connected to line 26, is typically utilized to elevate the bed 16. However, the valve 32 must be opened in order to allow the cylinders 18 to extend and, without the air compressor carried by tractor 12, the valve 32 cannot be opened by air pressure through line 28. In order to avoid this situation, a manual means of opening the valve 32 is provided by the actuating bolt 86. Bolt 86, as explained previously, is stored apart from the stop valve 32 during normal operation and a plug takes its place in housing bore 38. Should it become necessary to manually open the valve, the operator can remove the plug and insert the bolt 86 through the housing bore 38. End 92 screws into the piston bore 62 approximately three-eighths of an inch.

The nut 94 may be tightened to draw the piston from its closed position shown in FIG. 4 into its open position shown in FIG. 3. The fluid path through the housing 34 may thereby be opened manually in order to permit the bed to be elevated. When it is no longer necessary to lock the valve in its open condition, the operator may loosen the nut 94 and allow the piston to return to its closed position of FIG. 4. The bolt may thereafter be unscrewed from the piston, removed from housing 34, and returned to storage until needed again.

From the foregoing, it will be seen that the subject invention achieves its stated objectives and other objectives that will be recognized by those skilled in the art. The subject preventative stop valve is of reliable construction, convenient to activate, and operates predictably when needed to effectively abate the loss of fluid from the hydraulic line in the event of a rupture. The valve is controlled pneumatically by the airline to the air brakes of the trailer and its operative status is tested each time the trailer brakes are set and released. Moreover, the operation of the valve is by means of brake controls that are familiar to, and within convenient access of, the operator.

In addition, the stop valve retrofits to existing trailer units with minimal inconvenience and can be installed simply and quickly. The method for installing the valve simply involves: disconnecting the oil line into the cylinder system 18; interposing the stop valve in-line with the oil line, preferably at the connection to the cylinder system 18; connecting the pneumatic control port of the stop valve to the brake air line to the brakes of the trailer; and utilizing the original controls for the trailer brakes to open and close the stop valve. Finally, manual override means is provided for situations where the valve must be in the open state but the pneumatic control line to the stop valve is disconnected.

While the above describes a preferred embodiment of the invention, the invention is not intended to be so limited. Other oil spill preventative valve configuration that function differently but which utilize the air line to trailer brakes as a control mechanism are intended to be within the scope and spirit of the invention.

What is claimed is:

1. A preventative stop valve system for a wheeled truck trailer of the trailer type comprising air pressure activated brakes; a brake air line for delivering pressurized air to the brakes; a hydraulic fluid activated trailer lift cylinder; a hydraulic fluid line for delivering pressurized hydraulic fluid to the lift cylinder; the stop valve system comprising:

a. an elongate valve housing positioned in the hydraulic fluid conduit line, the valve housing comprising: external sidewalls, first and second end walls, and an internal longitudinal chamber defined by internal sidewalls; a transversely oriented fluid intake bore extending through the housing external sidewall in communication with the internal housing chamber and the hydraulic fluid conduit line; a transversely oriented fluid outlet bore extending through the housing external sidewall in communication with the internal housing chamber and the hydraulic fluid conduit line, the fluid outlet bore establishing a fluid path with the fluid inlet bore though the housing chamber; an air intake portal extending through the first end wall in communication with the internal housing chamber and connected by a conduit to the trailer air conduit line;

b. an elongate piston seated within the housing chamber and reciprocally moveable between an open position and a closed position within the chamber, the piston comprising a first portion dimensioned to obstruct the fluid path between the fluid inlet bore and fluid outlet bore with the piston in the closed position; and the piston further comprising a second portion configured to allow the flow of fluid between the fluid inlet bore and fluid outlet bore with the piston in the open position.

2. A stop valve as set forth in claim 1, wherein the piston moves between the open and the closed positions responsive to a differential in air pressure at the air intake portal.

3. A stop valve as set forth in claim 2, further comprising a spring member disposed within the housing chamber for biasing the piston into the closed position.

4. A stop valve as set forth in claim 3, wherein the presence of relatively high air pressure at the air intake portal overrides the spring member bias and moves the piston to the open position.

5. A stop valve as set forth in claim 4, wherein further comprising an override arm that extends through the housing second end wall and connects to the piston at a remote override arm end; the override arm selectively moving the piston between the open and closed positions.

6. A stop valve as set forth in claim 5, wherein the override arm comprises a threaded bolt extending through the housing second end wall in communication with the internal housing chamber and an adjustment nut accessible outside of the housing for moving the threaded bolt axially relative to the internal housing chamber.

7. A stop valve as set forth in claim 1, wherein a fluid seal exists between the piston first portion and the internal sidewalls of the housing chamber.

8. A stop valve as set forth in claim 7, wherein the piston second portion is of reduced sectional dimension relative to the piston first portion.

9. A stop valve as set forth in claim 1, wherein further comprising an override arm that extends through the housing second end wall and connects to the piston at a remote override arm end; the override arm selectively moving the piston between the open and closed positions.

10. A stop valve as set forth in claim 9, wherein the override arm comprises a threaded bolt extending through the housing second end wall in communication with the internal housing chamber and an adjustment nut accessible outside of the housing for moving the threaded bolt axially relative to the internal housing chamber.

11. A preventative stop valve system for a wheeled truck trailer of the trailer type comprising air pressure activated brakes; a brake air line for delivering pressurized air to the brakes; a hydraulic fluid activated trailer lift cylinder; a hydraulic fluid line for delivering pressurized hydraulic fluid to the lift cylinder; the stop valve system comprising:

a. an elongate valve housing positioned in the hydraulic fluid conduit line, the valve housing comprising: external sidewalls, first and second end walls, and an internal longitudinal chamber defined by internal sidewalls; a transversely oriented fluid intake bore extending through the housing external sidewall in communication with the internal housing chamber and the hydraulic fluid conduit line; a transversely oriented fluid outlet bore extending through the housing external sidewall in communication with the internal housing chamber and the hydraulic fluid conduit line, the fluid outlet bore establishing a fluid path with the fluid inlet bore through the housing chamber; an air intake portal extending through the first end wall in communication with the internal housing chamber and connected by a conduit to the trailer air conduit line;

b. an elongate piston seated within the housing chamber and reciprocally moveable between an open position and a closed position within the chamber, the piston comprising a first portion dimensioned to obstruct the fluid path between the fluid inlet bore and the fluid outlet bore with the piston in the closed position; and the piston further comprising a second portion configured to allow the flow of fluid between the fluid inlet bore and the fluid outlet bore with the piston in the open position.

12. A stop valve system as set forth in claim 11, wherein the piston moves between the open and the closed positions responsive to a differential in air pressure in the brake air line.

13. A stop valve system as set forth in claim 12, further comprising a spring member disposed within the housing chamber for biasing the piston into the closed position.

14. A stop valve system as set forth in claim 13, wherein the presence of relatively high air pressure in the brake air conduit line overrides the spring member bias and moves the piston to the open position.

15. A stop valve system as set forth in claim 14, wherein further comprising an override arm that extends through the housing second end wall and connects to the piston at a remote override arm end; the override arm selectively moving the piston between the open and closed positions.

16. A stop valve system as set forth in claim 15, wherein the override arm comprises a threaded bolt extending through the housing second end wall in communication with the internal housing chamber and an adjustment nut accessible outside of the housing for axially moving the threaded bolt relative to the internal housing chamber.

17. A stop valve system as set forth in claim 11, wherein a fluid seal exists between the piston first portion and the internal sidewalls of the housing chamber.

18. A stop valve system as set forth in claim 17, wherein the piston second portion is of reduced sectional dimension relative to the piston first portion.

19. A stop valve system as set forth in claim 11, wherein further comprising an override arm that extends through the housing second end wall and connects to the piston at a remote override arm end; the override arm selectively moving the piston between the open and closed positions.

20. A stop valve system as set forth in claim 19, wherein the override arm comprises a threaded bolt extending through the housing second end wall in communication with the internal housing chamber and an adjustment nut accessible outside of the housing for axially moving the threaded bolt relative to the internal housing chamber.

21. A preventive stop valve system for a wheeled truck trailer of the trailer type comprising: air pressure activated brakes; a brake air line for delivering pressurized air to the brakes; a hydraulic fluid line for delivering pressurized hydraulic fluid to the trailer; the stop valve system comprising:

a. a stop valve connected in-line to the hydraulic fluid line, the stop valve comprising a pneumatic control port and means for selectively opening and closing the flow of hydraulic fluid in the hydraulic fluid line responsive to air pressure at the pneumatic control port;

b. a pneumatic control line connecting the pneumatic control port of the stop valve to the brake line controlling the brakes of the trailer.

22. A retrofit method for preventing the discharge of hydraulic fluid from a lift unit on a wheeled tractor-trailer truck, of the tractor-trailer type comprising: air pressure activated trailer brakes; a brake air line for delivering pressurized air to the trailer brakes; at least one hydraulic lift cylinder mounted to the trailer; and a hydraulic fluid line for delivering pressurized hydraulic fluid to the lift cylinder; the method comprising the steps of:

a. connectively interposing a stop valve into the hydraulic fluid line, the stop valve selectively opening and closing the flow of hydraulic fluid in the hydraulic fluid line responsive to air pressure at a pneumatic control port;

b. connecting the pneumatic control port of the stop valve to the brake line controlling the brakes of the trailer; and    c. utilizing the controls for the brakes to open and close the stop valve.

23. A retrofit method for preventing the discharge of hydraulic fluid from a lift unit on a wheeled tractor-trailer truck, of the tractor-trailer type comprising: air pressure activated trailer brakes; a brake air line for delivering pressurized air to the trailer brakes; at least one hydraulic lift cylinder mounted to the trailer; and a hydraulic fluid line for delivering pressurized hydraulic fluid to the lift cylinder; the method comprising the steps of:

a. connecting a stop valve housing in the hydraulic line, the housing including an air intake portal at one end; an elongate piston seated within a central chamber of the housing and reciprocally moveable within the chamber responsive to a drop in air pressure at the air intake portal between an open position and a closed position, the piston obstructing the flow of fluid through the housing in the closed position and allowing the flow of fluid through the housing in the open position;

b. connecting the air intake portal of the valve housing to the trailer brake air line;

c. releasing the brakes of the tractor-trailer to cause a drop in air pressure at the air intake portal of the stop valve and consequently move the piston into the closed position.

\* \* \* \* \*